(No Model.)

S. RIEFLER.
MERCURIAL COMPENSATION PENDULUM.

No. 508,530. Patented Nov. 14, 1893.

Witnesses:
A. Walther.
Carl Roßbach.

Inventor:
Sigmund Riefler.
by Robert Dimler
Attorney.

UNITED STATES PATENT OFFICE.

SIGMUND RIEFLER, OF MUNICH, GERMANY.

MERCURIAL COMPENSATION-PENDULUM.

SPECIFICATION forming part of Letters Patent No. 508,530, dated November 14, 1893.

Application filed August 28, 1891. Serial No. 404,032. (No model.)

*To all whom it may concern:*

Be it known that I, SIGMUND RIEFLER, engineer and manufacturer, a subject of the King of Bavaria, residing at Munich, in the Kingdom of Bavaria, Germany, have invented a new and useful Improvement in Mercurial Compensation-Pendulums, of which the following is a clear and exact specification.

My invention relates to pendulums known by the name of mercurial-compensation-pendulums and the object is to increase the compensating effect to the utmost accuracy. This object I obtain by collecting the mercury merely in the hollow of the pendulum-rod.

In order to make my invention well understood, I refer to the accompanying drawings which represent my pendulum suitable to my purpose, of which—

Figure 1:
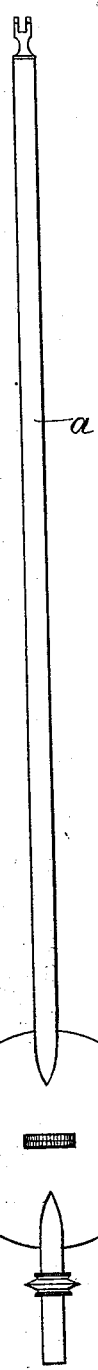
Figure 2:
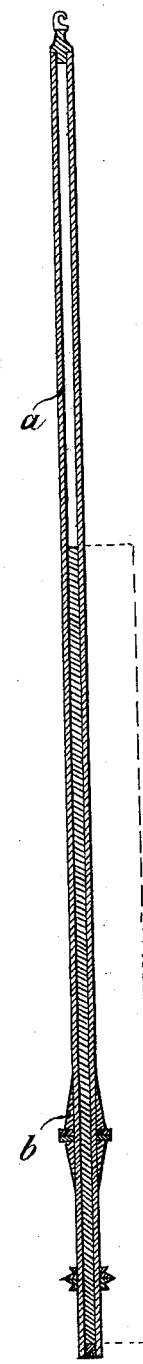

Figure 1 is a front and Fig. 2 is a side sectional view.

The rod $a$ is a straight tube made of any suitable material preferably of steel. The same is filled up with quicksilver. The height of the column of mercury is dependent on the weight of the pendulum-bob $b$, on the inner width of the tube and also on its weight. The effect the mercury takes upon the pendulum by the change of temperature is evident. By the fall of the same the quicksilver shrinks together, thus causing the center of gravity to lower, at the same time also the tube shrinks in its length, thus raising the pendulum bob and with it the center of gravity again. When the temperature rises, the effect will be reversed to the first, that is to say, the mercury expands and thus raises its center of gravity, while by the expansion of the tubular rod, the center of gravity of the pendulum-bob lowers. By these means an exact compensation is obtained. The amount of quicksilver to be used for each pendulum, may be carefully calculated, when the same is to be filled, and since the compensating effect not only is dependent of height and weight of the mercury-column, but also of the weight of the complete matter, the latter may be increased or decreased for sake of regulation, without altering the amount of quicksilver employed.

I will now point out the great advantages my new pendulum has in comparison to other mercurial-compensation-pendulums. First, the compensation not only will be an exact one, when the temperature changes slowly, but also will be as true, when sudden variations of temperature take place. The reason thereof is this: the quantity of quicksilver is distributed about almost the whole length of the rod, and the same having also close contact therewith, will partake of the change of temperature almost as soon as the rod itself does, and therefore the expansion or contraction of the rod and of the mercury will nearly take place at the same time. In other mercurial-compensation-pendulums the quicksilver is collected in a vessel at the lower end. Secondly, also differences in the temperature of the air at different parts of the pendulum rod, will not only influence the rod, but also the mercury and therefore have no disturbing effect in the compensation. Moreover the pendulum may be made of any suitable shape, as for instance that of a flat disk with sharp edges, or may be slightly curved like a double concave lens. Thereby the air is easily cut, and little resistance is offered to the same. Finally the pendulum will be much cheaper than others, since the amount of quicksilver required will be only one quarter of that used heretofore.

Having thus fully described the nature of my said invention and in what manner the same may be carried into effect, I declare that what I claim, and desire to secure by Letters Patent of the United States, is—

1. In a compensation-pendulum for clocks: the pendulum-rod $a$, consisting of a tube closed at both ends and partially filled with mercury, for the purpose set forth.

2. In a compensation-pendulum for clocks: the combination of the pendulum-rod $a$, consisting of a tube closed at both ends and partially filled with mercury, with an ordinary pendulum-bob $b$, substantially as and for the purpose described.

In testimony whereof I have signed this specification in the presence of two subscribing witnesses.

SIGMUND RIEFLER.

Witnesses:
R. HERPICH,
E. SCHULTZE.